No. 639,949. Patented Dec. 26, 1899.
W. & L. H. SWAIN.
MACHINE FOR MANUFACTURING INFLATABLE TIRES.
(Application filed Jan. 6, 1899.)
(No Model.)
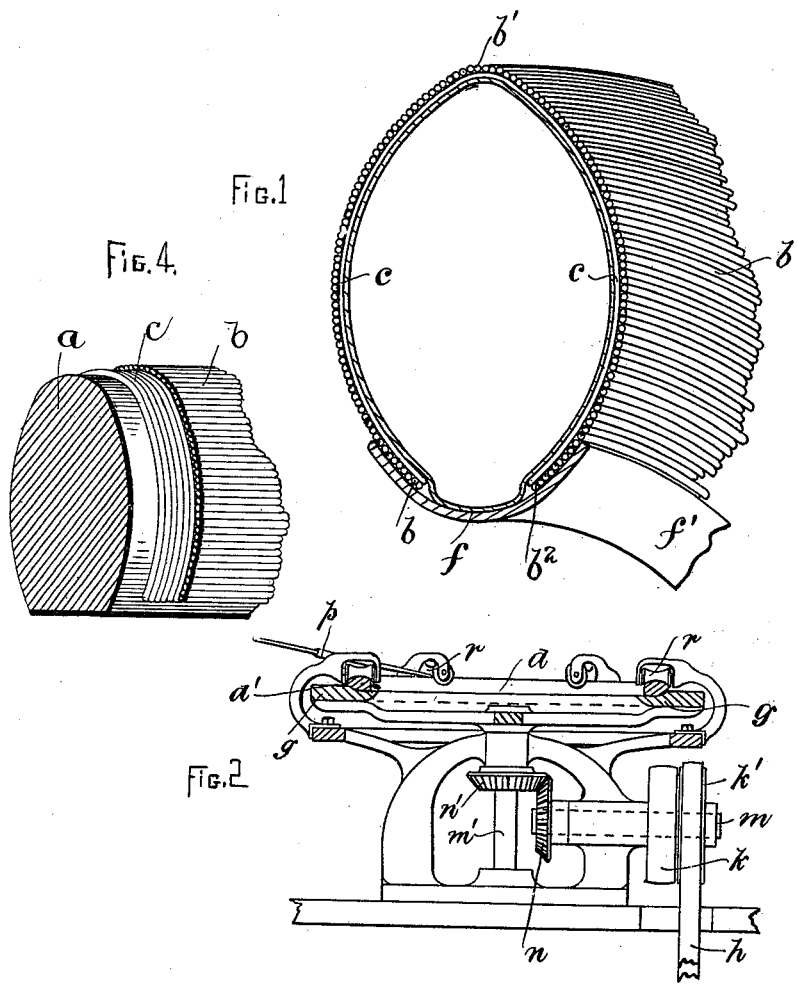

UNITED STATES PATENT OFFICE.

WALTER SWAIN AND LEONARD HARTLEY SWAIN, OF BOLTON, ENGLAND.

MACHINE FOR MANUFACTURING INFLATABLE TIRES.

SPECIFICATION forming part of Letters Patent No. 639,949, dated December 26, 1899.

Application filed January 6, 1899. Serial No. 701,320. (No model.)

*To all whom it may concern:*

Be it known that we, WALTER SWAIN and LEONARD HARTLEY SWAIN, subjects of the Queen of Great Britain, and residents of 177 Belmont road, Astley Bridge, Bolton, in the county of Lancaster, England, have invented certain new and useful Improvements in Machines for the Manufacture of Inflatable Tires, of which the following description, together with the accompanying sheet of drawings, is a specification.

Our invention relates to mechanism for use in the production of the canvas parts of inflatable tires for the wheels of road-vehicles of the class wherein the said canvas parts or coverings are formed by the longitudinal or circumferential threads being laid over or taking under cross-threads, to which they are secured with india-rubber solution or other adhesive substance and not by being interlaced or woven together, the said method of constructing said canvas parts being for the purpose of producing a tire of such a nature that on its being inflated it will assume a specific and desired shape in cross-section, be that any of the varied shapes to suit the varied requirements for which tires have to be used, as in the case of racing, traveling on roads or highways, &c.; and our said invention consists in the construction or formation and arrangement of parts in combination whereby a device or machine is produced that may be employed in the manufacture of said canvas parts, whether such are formed by a series of threads being measured and cut to the required lengths according to the circumferential positions that they have to occupy in the tire, their outer ends being afterward folded over each other and secured by an adhesive substance, as will be understood, or whether said canvas parts are made by the winding of the circumferential threads upon a shaping-piece to form them endless without joint or joining part.

In the accompanying sheet of drawings, Figure 1 is a part perspective and part sectional end elevation of the canvas part of a tire of the construction hereinbefore referred to and showing said canvas part as containing the usual inflatable tube. Fig. 2 is a part sectional elevation of a machine, drawn to a reduced scale, for making or shaping the endless or jointless form of canvas part above described. Fig. 3 is a view of the parts shown by Fig. 2 as seen from above. Fig. 4 represents an enlarged perspective sectional view of the former, showing the arrangement of the inner and outer threads.

The canvas part of the tire for the manufacture of which we have invented our device or machine is made to retain or withstand the internal pressure of air by each of its circumferential threads $b$ being of such a length that when thus distended it will occupy its proper position relatively with its neighboring threads throughout the entire width of the canvas part. Thus the threads at the edges $b^2$ $b^2$ are of such a length that the circle they form is just within that formed by the outer edge of the rim $f'$, while the succeeding coils or circles of threads increase in diameter until the outer periphery at $b'$ is reached, and these threads are kept in position laterally by being placed over inner cross-threads $c$, one of which is shown in Fig. 1, (or these cross-threads $c$ may be placed on the outside of the threads $b$, if desired,) to which they are secured by the adhesive substance.

In producing the endless form of the canvas part we employ an annular shaping-piece $a$, which we detachably secure by any suitable means upon the rotary table $g$, which derives its motion from a belt $h$ through the pulley $k$, the shaft $m$ $m'$, and the wheels $n$ $n'$, the pulley $k$ running loosely on its shaft $m$, while the pulley $k'$ and the wheels $n$ $n'$ are respectively secured to the shaft $m$ $m'$.

The thread or yarn $b$ is covered with an adhesive substance, (which it may be arranged to gather as it is passing to the shaping-piece $a$ or with which it may be covered prior thereto,) so that as the table $g$ rotates and carries with it the shaping-piece $a$ said thread is drawn thereby and wound upon said piece $a$, each coil being conducted by a guide $p$ and pressed by a series of rollers $r$, so that it may occupy its proper position in proximity with its neighboring coils. When the outer peripheral edge $a'$ of the shaping-piece $a$ is reached, said piece $a$ is detached from the table $g$ and turned over, (carrying with it the threads wound upon it,) in order that the winding of the yarn may be continued to cover the other side of the piece $a$ and so produce this part of the fabric, as desired. The cross-threads c having been previously placed upon the shaping-piece a by hand or any suitable mechanism and located substantially as represented in Fig. 4 are covered with an adhesive substance and will adhere to the coiled threads b, wound thereon, and so produce the fabric, as desired, when such cross-threads c are required to be within or on the inside of the tires. If desired, however, the circumferential threads b may be first laid on the annular shaping-piece or former and the cross-threads c afterward laid on the outside of the threads b by hand or otherwise after removal of the former from the machine.

The threads b and c compose what we have referred to as the canvas part of the tire. In practice and before said part is applied to the rim f' of a bicycle-wheel an inflatable tube of the ordinary type is inserted inside the canvas part, as is usual, said tube being represented at f in Fig. 1.

Such being the nature and object of our invention, what we claim is—

1. In mechanism for producing the canvas part of an inflatable tire, a support, an annular shaping-piece removably mounted thereon, and means for winding coils of threads annularly on said shaping-piece, substantially as described.

2. In mechanism of the class described, an annular shaping-piece, a rotary table arranged to receive said shaping-piece, shafts, gearing-wheels and pulleys for transmitting motion to said table, and means for laying threads annularly on said shaping-piece, substantially as herein specified.

3. In mechanism of the class described, an annular shaping-piece, a rotary table arranged to receive said shaping-piece, means for transmitting motion to said rotary table, a guide for conducting the thread to be wound annularly upon said shaping-piece, and a roller or series of rollers for pressing the same against said shaping-piece, substantially as set forth.

WALTER SWAIN.
LEONARD HARTLEY SWAIN.

Witnesses:
SAMUEL HEY,
JOHN WHITEHEAD.